US010250706B2

(12) United States Patent
Singh et al.

(10) Patent No.: US 10,250,706 B2
(45) Date of Patent: Apr. 2, 2019

(54) HIERARCHICAL CLUSTERING

(71) Applicant: Bank of America Corporation, Charlotte, NC (US)

(72) Inventors: Mandeep Singh, Medford, MA (US); Xiaofeng Wang, Princeton Junction, NJ (US)

(73) Assignee: Bank of America Corporation, Charlotte, NC (US)

( * ) Notice: Subject to any disclaimer, the term of this patent is extended or adjusted under 35 U.S.C. 154(b) by 298 days.

(21) Appl. No.: 15/225,372

(22) Filed: Aug. 1, 2016

(65) Prior Publication Data

US 2018/0034700 A1    Feb. 1, 2018

(51) Int. Cl.
*G06F 15/173*    (2006.01)
*H04L 29/08*    (2006.01)

(52) U.S. Cl.
CPC .............. *H04L 67/22* (2013.01); *H04L 67/02* (2013.01)

(58) Field of Classification Search
CPC . H04L 41/0893; H04L 43/0876; H04L 43/16; H04L 67/02
USPC ........................................................ 709/224
See application file for complete search history.

(56) References Cited

U.S. PATENT DOCUMENTS

| | | | | |
|---|---|---|---|---|
| 9,609,459 | B2* | 3/2017 | Raleigh | G06Q 10/06375 |
| 2017/0140041 | A1* | 5/2017 | Dotan-Cohen | G06Q 10/04 |
| 2017/0150285 | A1* | 5/2017 | Krantz | H04R 29/001 |
| 2017/0289168 | A1* | 10/2017 | Bar | H04L 63/0853 |
| 2017/0309196 | A1* | 10/2017 | Vangala | G09B 5/125 |

OTHER PUBLICATIONS

Mandeep Singh et al., U.S. Appl. No. 15/225,347, "Hierarchical Clustering," filed Aug. 1, 2016.

* cited by examiner

*Primary Examiner* — Kristie D Shingles
(74) *Attorney, Agent, or Firm* — Baker Botts L.L.P.

(57) ABSTRACT

In one embodiment, a method includes receiving first network usage data for user devices indicating activity by the user devices on webpages, determining first-level cluster centroids based on the first network usage data, and assigning each user device to at least one first-level cluster centroid. The method also includes determining second-level cluster centroids based on the first network usage data for user devices assigned to a particular first-level cluster centroid, and assigning each user device previously assigned to the particular first-level cluster centroid to at least one second-level cluster centroid. The method further includes determining clusters based on the first-level cluster centroids and the second-level cluster centroids, assigning each user device to at least one cluster, and sending one or more first notifications to user devices associated with a particular cluster.

20 Claims, 7 Drawing Sheets

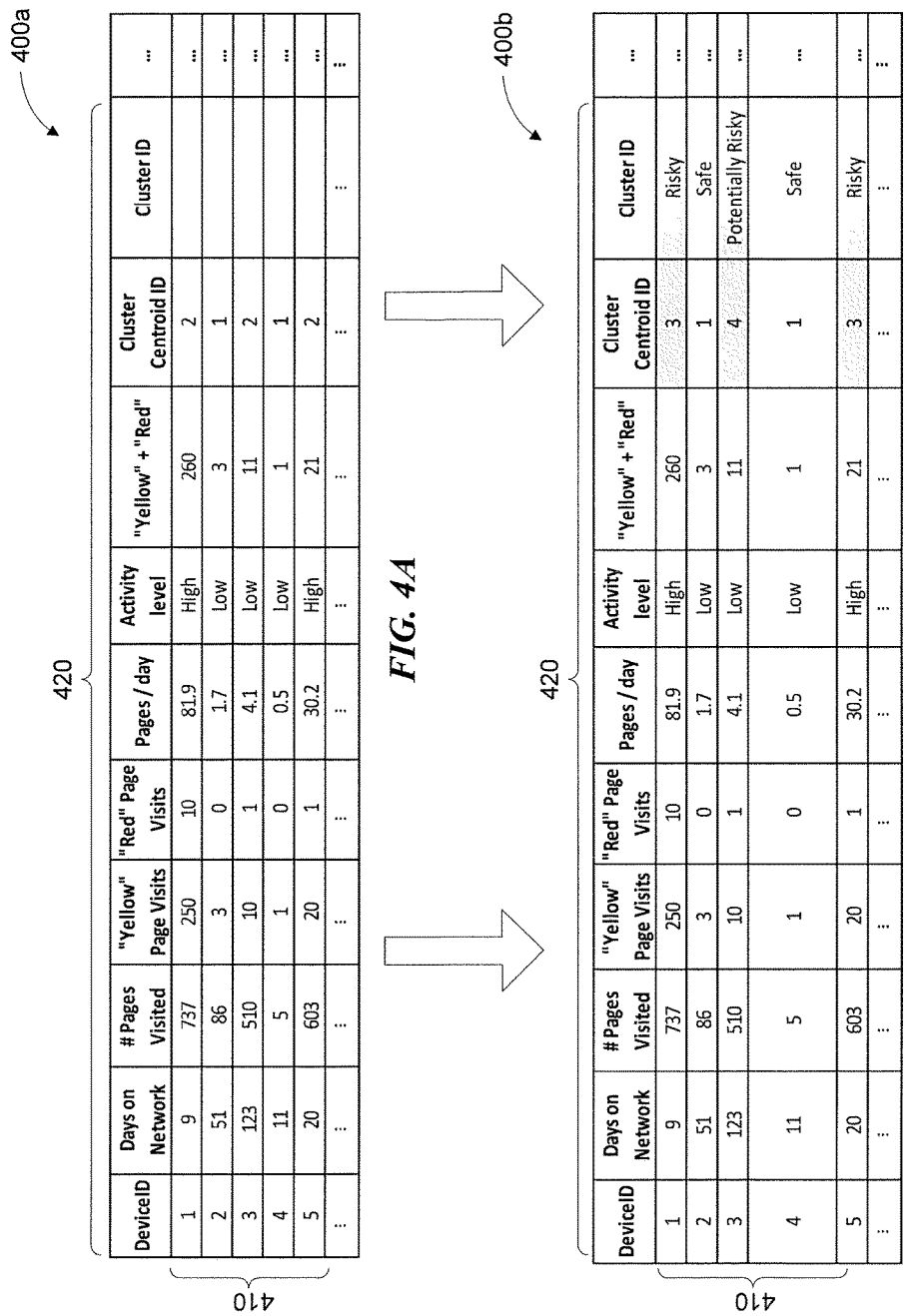

HIERARCHICAL CLUSTERING

TECHNICAL FIELD

This disclosure relates generally to clustering, and more particularly to a hierarchical method for clustering data points.

BACKGROUND

Clustering refers to a method for analyzing data points, and may be used, for example, in analyzing the behavior of individuals or devices associated with the data points. However, there are limitations on typical clustering methods. For instance, they may not work well with data points having multiple dimensions. This is because computationally efficient methods, such as k-means clustering methods, may not cluster data points well enough to provide valuable insights. More sophisticated clustering may attempt to address some of these issues, but may also utilize much more computing resources and/or time.

SUMMARY OF THE DISCLOSURE

According to an embodiment, a method includes receiving first network usage data for a plurality of user devices, the first network usage data indicating activity by the user devices on a plurality of webpages, determining a plurality of first-level cluster centroids based on the first network usage data, and assigning each user device to at least one of the first-level cluster centroids. The method also includes determining a plurality of second-level cluster centroids based on the first network usage data for user devices assigned to a first first-level cluster centroid, and assigning each user device previously assigned to the first first-level cluster centroid to at least one of the second-level cluster centroids. The method further includes determining a plurality of clusters based on the first-level cluster centroids and the second-level cluster centroids, assigning each user device to at least one cluster of the plurality of clusters, and sending one or more first notifications to user devices associated with a first cluster of the plurality of clusters.

According to another embodiment, a system includes one or more memory comprising instructions, one or more interfaces configured to receive first network usage data for a plurality of user devices, the first network usage data indicating activity by the user devices on a plurality of webpages, and one or more processors communicably coupled to the memory and the interfaces. The one or more processors are configured, when executing the instructions, to determine a plurality of first-level cluster centroids based on the first network usage data and assign each user device to at least one of the first-level cluster centroids. The one or more processors are configured, when executing the instructions, to determine a plurality of second-level cluster centroids based on the first network usage data for user devices assigned to a first first-level cluster centroid and assign each user device previously assigned to the first first-level cluster centroid to at least one of the second-level cluster centroids. The one or more processors are configured, when executing the instructions, to determine a plurality of clusters based on the first-level cluster centroids and the second-level cluster centroids and assign each user device to at least one cluster of the plurality of clusters. The one or more interfaces are further configured to send one or more first notifications to user devices associated with a first cluster of the plurality of clusters.

According to yet another embodiment, a computer readable medium includes instructions that are configured, when executed by a processor, to receive first network usage data for a plurality of user devices, the first network usage data indicating activity by the user devices on a plurality of webpages, determine a plurality of first-level cluster centroids based on the first network usage data, and assign each user device to at least one of the first-level cluster centroids. The instructions are further configured, when executed, to determine a plurality of second-level cluster centroids based on the first network usage data for user devices assigned to a first first-level cluster centroid and assign each user device previously assigned to the first first-level cluster centroid to at least one of the second-level cluster centroids. The instructions are further configured, when executed, to determine a plurality of clusters based on the first-level cluster centroids and the second-level cluster centroids, assign each user device to at least one cluster of the plurality of clusters, and send one or more first notifications to user devices associated with a first cluster of the plurality of clusters.

Certain embodiments provide one or more technical advantages. For example, data points may be analyzed more accurately than before. This may allow network security managers with the ability to more accurately control and/or predict the behavior of users on the network. In addition, such a hierarchical method of data analysis may provide computational efficiencies and may accordingly utilize less computing resources than known methods for accurately clustering data points. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which:

FIGS. 4A-4B illustrate an example data structure before and after, respectively, determining and assigning data points to second-level cluster centroids in accordance with embodiments of the present disclosure;

DETAILED DESCRIPTION

Figure 1:
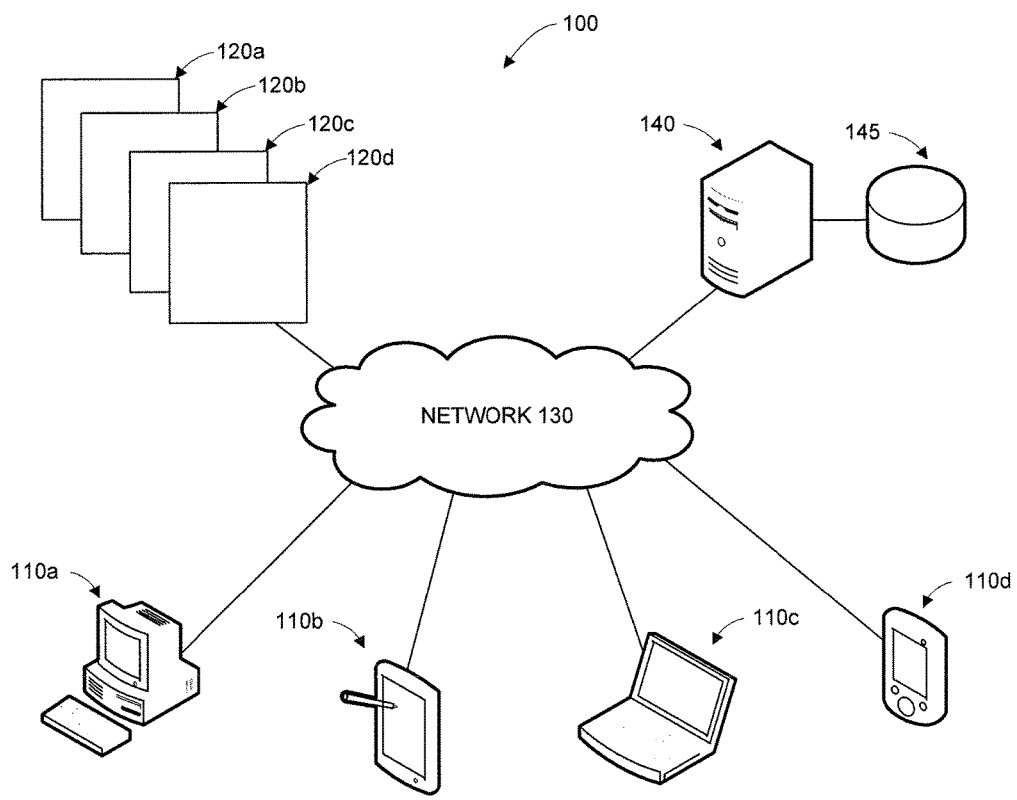
FIG. 1 illustrates an example system comprising user devices accessing webpages over network in accordance with embodiments of the present disclosure.

Data indicating users' access of webpages may be quite useful to analyze. For example, such data may be analyzed to determine and/or predict behaviors or trends associated with users accessing webpages on one or more domains. Once user behavior has been determined or predicted, one or more actions may be taken by a network manager. For instance, users accessing risky webpages or engaging in risky online behavior may compromise a network's security by exposing it to viruses, malware, spyware, and the like. If it is determined that particular users continue to exhibit this behavior, or event that such users are predicted to continue in the behavior, notifications may be sent to appropriate authorities (e.g., the users' direct managers or network security managers) and their network access may be modified (e.g., they may be quarantined, their access may be blocked, or they may be more closely monitored using a monitoring server).

One way of analyzing user behavior is through the use of clustering methods. However, there are limitations on typical clustering methods. For instance, they may not work well with data points having multiple dimensions (e.g., those with greater than two dimensions) due to the complexities of such data points. While certain clustering methods may be computationally efficient, such as k-means clustering methods, they may not cluster data points well enough to provide valuable insights on the data under analysis. More sophisticated clustering methods may attempt to address some of these issues, but they may also utilize much more computing resources and/or time in doing so.

Accordingly, aspects of the present disclosure may provide a hierarchical method of clustering data points that may accurately cluster data points with multiple dimensions in an efficient manner. The method may include performing a first pass clustering method using a computationally efficient method, such as the k-means clustering method, to determine a plurality of first-level cluster centroids. Then, a second pass clustering method may be performed on data points associated with a particular first-level cluster centroid to determine a plurality of second-level cluster centroids. The particular first-level cluster centroid may be chosen for a second pass clustering method due to the data points having an average distance from the first-level cluster centroid that is greater than a particular threshold (i.e., the data points associated with the first-level cluster centroid are not closely "clustered"). Accordingly, the second pass clustering may have the effect of creating cluster centroids that more closely predict user behavior of the data points associated with the particular first-level cluster centroid. The second pass clustering method may also be a computationally efficient method, such as the k-means clustering method. A third, fourth, fifth, or additional clustering passes may be similarly performed on data points associated with already-determined cluster centroids as necessary, such as until the average distance of data points from their respective cluster centroids is below a certain threshold. The additional passes of clustering may be performed iteratively, in certain embodiments, until the average distance of data points from their respective cluster centroids is below the certain threshold.

Using such a hierarchical cluster method may provide numerous advantages. For example, data points may be analyzed more accurately than before. This may allow network security managers to more accurately predict and proactively control the behavior of users on their network. In addition, such a hierarchical method of data analysis may provide computational efficiencies and may accordingly utilize less computing resources than known methods for accurately clustering data points. The methods of the present disclosure may also require less time for computation than other clustering methods. Although certain advantages have been described above, embodiments of the present disclosure may include none, some, or all of these technical advantages.

Embodiments of the present disclosure and its advantages may be best understood by referring to FIGS. 1-6, where like numbers are used to indicate like and corresponding parts. In no way should the following examples be read to limit or define the scope of the disclosure.

FIG. 1 illustrates an example system 100 comprising user devices 110 accessing webpages 120 over network 130 in accordance with embodiments of the present disclosure. User devices 110 may include any suitable computing device that may access one or more webpages 120 using network 130. User devices 110 may include devices that connect to network 130 using a wireline connection, or devices that connect to network 130 using a wireless connection (e.g., using wireless-fidelity (WI-FI), and/or BLUETOOTH capabilities). As illustrated in FIG. 1, user devices 110 include desktop 110a, tablet 110b, laptop 110c, and smartphone 110d.

System 100 also includes server 140, which may analyze and log information associated with network traffic sent to and from user devices 110. In particular, server 140 may gather information about the webpages 120 that the user devices 110 visit, and may store that information as network usage data in database 145. An example data structure that may represent network usage data is described further below with respect to FIGS. 4A-4B. Server 140 may access or receive the stored network usage data in database 145, and may use the network usage data in performing one or more of the hierarchical clustering methods disclosed herein, such as those methods described below with respect to FIGS. 5 and 6.

Network 130 may include any suitable technique for communicably coupling user devices 110 with server 140. For example, network 130 may include an ad-hoc network, an intranet, an extranet, a virtual private network (VPN), a wired or wireless local area network (LAN), wide area network (WAN), metropolitan area network (MAN), a portion of the Internet, a portion of the Public Switched Telephone Network (PSTN), a portion of a cellular telephone network, or any combination thereof.

Modifications, additions, or omissions may be made to FIG. 1 without departing from the scope of the present disclosure. For example, FIG. 1 illustrates particular types of user devices 110. However, it will be understood that any suitable type of user device 110 may be used. As another example, although illustrated as a single server, server 140 may include a plurality of servers in certain embodiments.

Figure 2:
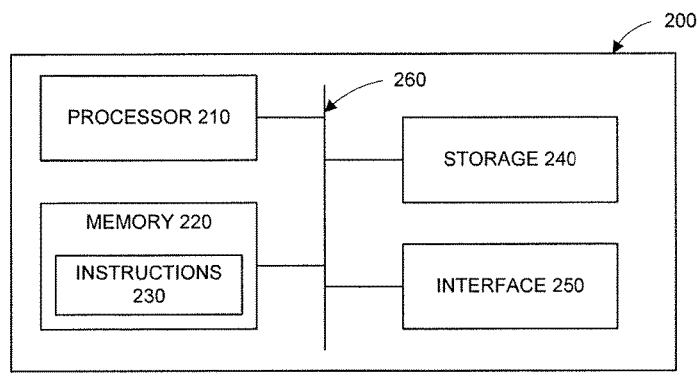
FIG. 2 illustrates an example computer system in accordance with embodiments of the present disclosure.

FIG. 2 illustrates an example computer system 200, in accordance with embodiments of the present disclosure. One or more aspects of computer system 200 may be used in user devices 110 or server 140 of FIG. 1. For example, each of user devices 110 or server 140 may include a computer system 200 in some embodiments. As another example, each of user devices 110 or server 140 may include two or more computer systems 200 in some embodiments.

Computer system 200 includes a processor 210, memory 220 comprising instructions 230, storage 240, interface 250, and bus 260. These components may work together to perform one or more steps of one or more methods (e.g. methods 500 and 600 of FIGS. 5 and 6, respectively) and provide the functionality described herein. For example, in particular embodiments, instructions 230 in memory 220 may be executed on processor 210 in order to use network usage data received by interface 250 in performing hierarchical clustering methods. In certain embodiments, instructions 230 may reside in storage 240 instead of, or in addition to, memory 220.

Processor 210 may be a microprocessor, controller, application specific integrated circuit (ASIC), or any other suitable device or logic operable to provide, either alone or in conjunction with other components (e.g., memory 220 and instructions 230) functionality according to the present disclosure. Such functionality may include performing hierarchical clustering methods, as discussed herein. In particular embodiments, processor 210 may include hardware for executing instructions 230, such as those making up a computer program or application. As an example, to execute instructions 230, processor 210 may retrieve (or fetch) instructions 230 from memory 220, or from an internal register, an internal cache, or storage 240; decode and execute them; and then write one or more results of the execution to an internal register, an internal cache, memory 220, or storage 240.

Memory 220 may be any form of volatile or non-volatile memory including, without limitation, magnetic media, optical media, random access memory (RAM), read-only memory (ROM), flash memory, removable media, or any other suitable local or remote memory component or components. Memory 220 may store any suitable data or information utilized by computer system 200, including software (e.g., instructions 230) embedded in a computer readable medium, and/or encoded logic incorporated in hardware or otherwise stored (e.g., firmware). In particular embodiments, memory 220 may include main memory for storing instructions 230 for processor 210 to execute or data for processor 210 to operate on. In particular embodiments, one or more memory management units (MMUs) may reside between processor 210 and memory 220 and facilitate accesses to memory 220 requested by processor 210.

Storage 240 may include mass storage for data or instructions (e.g., instructions 230). As an example, storage 240 may include a hard disk drive (HDD), a floppy disk drive, flash memory, an optical disc, a magneto-optical disc, magnetic tape, a Universal Serial Bus (USB) drive, a combination of two or more of these, or any suitable computer readable medium. Storage 240 may include removable or non-removable (or fixed) media, where appropriate. Storage 240 may be internal or external to computer system 200, where appropriate. In some embodiments, instructions 230 may be encoded in storage 240 in addition to, or in lieu of, memory 220.

Interface 250 may include hardware, encoded software, or both providing one or more interfaces for communication (such as, for example, packet-based communication) between computer systems on a network. As an example, interface 250 may include a network interface controller (NIC) or network adapter for communicating with an Ethernet or other wire-based network and/or a wireless NIC (WNIC) or wireless adapter for communicating with a wireless network. Interface 250 may include one or more connectors for communicating traffic (e.g., IP packets) via a bridge card. Depending on the embodiment, interface 250 may be any type of interface suitable for any type of network in which computer system 200 is used. In some embodiments, interface 250 may include one or more interfaces for one or more I/O devices. One or more of these I/O devices may enable communication between a person and computer system 200. As an example, an I/O device may include a keyboard, keypad, microphone, monitor, mouse, printer, scanner, speaker, still camera, stylus, tablet, touchscreen, trackball, video camera, another suitable I/O device or a combination of two or more of these.

Bus 260 may include any combination of hardware, software embedded in a computer readable medium, and/or encoded logic incorporated in hardware or otherwise stored (e.g., firmware) to communicably couple components of computer system 200 to each other. As an example, bus 260 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 260 may include any number, type, and/or configuration of buses 260, where appropriate. In particular embodiments, one or more buses 260 (which may each include an address bus and a data bus) may couple processor 210 to memory 220. Bus 260 may include one or more memory buses.

Modifications, additions, or omissions may be made to FIG. 2 without departing from the scope of the present disclosure. For example, FIG. 2 illustrates components of computer system 200 in a particular configuration. However, any configuration of processor 210, memory 220, instructions 230, storage 240, interface 250, and bus 260 may be used, including the use of multiple processors 210 and/or buses 260. In addition, computer system 200 may be physical or virtual.

FIGS. 3A-3F illustrate example steps of a hierarchical clustering method in accordance with embodiments of the present disclosure. In the step illustrated by FIG. 3A, a number of first-level cluster centroids 320 are determined using the data points 310. The first-level cluster centroids 320 may be determined using k-means clustering methods in certain embodiments. Each of data points 310 may then be assigned to one or more first-level cluster centroids 320 based on a distance from the data point 310 to the first-level cluster centroid 320. As shown, data points 310*a* are assigned to first-level cluster centroid 320*a*, data points 310*b* are assigned to first-level cluster centroid 320*b*, data points 310*c* are assigned to first-level cluster centroid 320*c*, and data points 310*d* are assigned to first-level cluster centroid 320*d*.

Figure 3A:
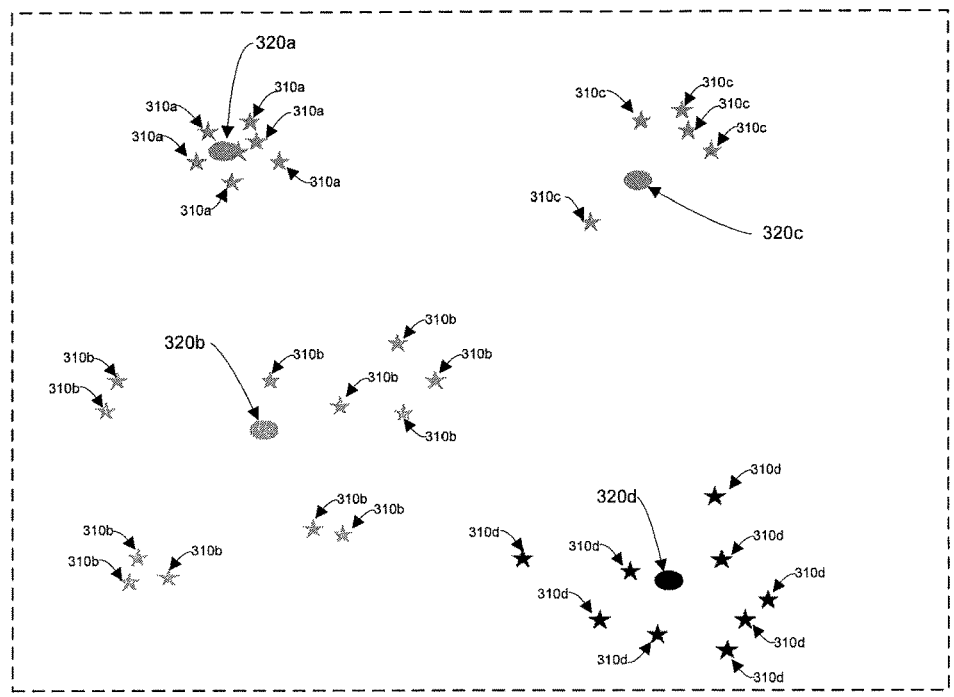
FIGS. 3A-3F illustrate example steps of a hierarchical clustering method in accordance with embodiments of the present disclosure.
Figure 3B:
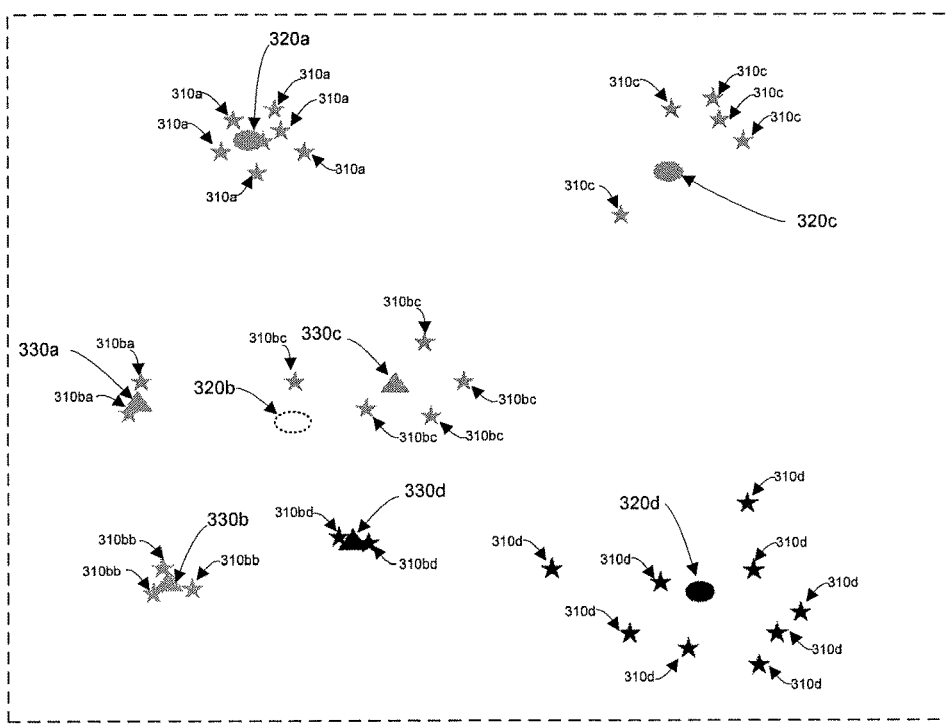

Next, in the step illustrated by FIG. 3B, a number of second-level cluster centroids 330 are determined using data points 310*b* assigned to first-level cluster centroid 320*b*. The second-level cluster centroids 330 may be determined using k-means clustering methods in certain embodiments. The choice to determine second-level cluster centroids 330 may be based on the average distance from the data points 310*b* to the first-level cluster centroid 320*b* in certain embodiments. For example, the second-level cluster centroids 330 may be determined if the average distance from the data points 310*b* to the first-level cluster centroid 320*b* is below a certain threshold. Each of data points 310*b* previously assigned to fist-level cluster centroid 320*b* may then be assigned to one or more second-level cluster centroids 330 based on a distance from the data point 310*b* to the second-level cluster centroid 330. As shown, data points 310*ba* are assigned to first-level cluster centroid 330*a*, data points 310*bb* are assigned to first-level cluster centroid 330*b*, data points 310*bc* are assigned to first-level cluster centroid 330*c*, and data points 310*bd* are assigned to first-level cluster centroid 330*d*.

The step illustrated by FIG. 3B may be repeated as often as needed for other first-level cluster centroids 320. Further, this step may be repeated for the determined second-level cluster centroids 330 as well. That is, a number of third-level cluster centroids may be determined for data points associated with a particular second-level cluster centroids. The step may be repeated in an iterative fashion until all data points 310 are assigned to cluster centroids (at any level) wherein the distances (or the average distances) between the data points 310 and the cluster centroids is below a threshold.

Figure 3C:
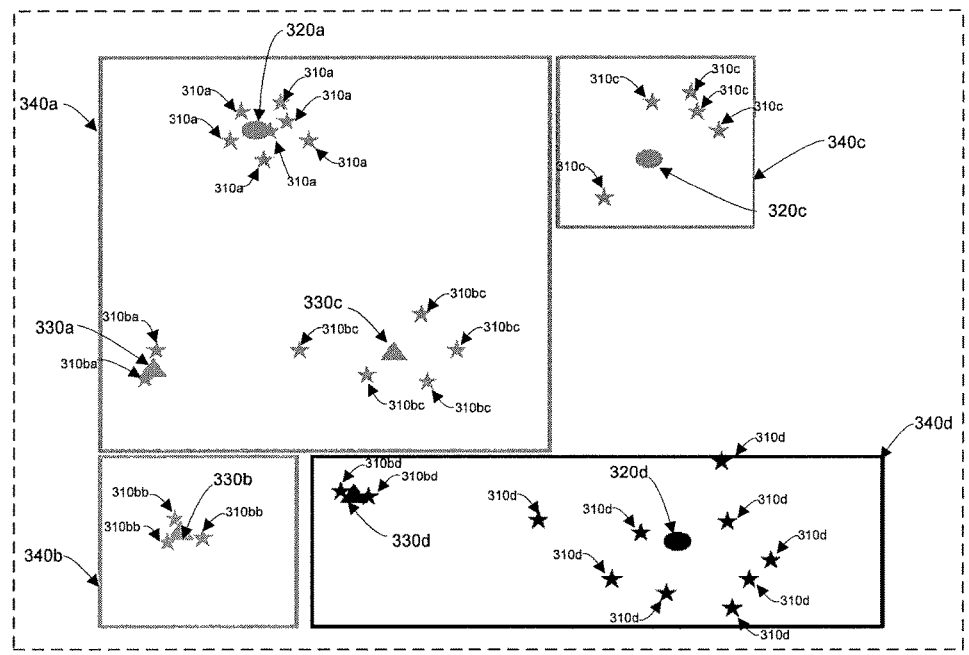

Finally, in the step illustrated by FIG. 3C, a number of clusters 340 are determined based on the first-level cluster centroids 320 and the second-level cluster centroids 320. The clusters 340 may be determined based on relative distances between the first-level cluster centroids 320 and the second-level cluster centroids 330 (and additional cluster centroids, such as third-level or fourth-level cluster centroids, where appropriate). The data points 310 may then be assigned to the determined clusters 340 based on their centroid assignment. As shown, data points 310a, 310ba, and 310bc are assigned to cluster 340a; data points 310bb are assigned to cluster 340b; data points 310c are assigned to cluster 340c; and data points 310bd and 310d are assigned to cluster 340d.

As will be understood, each of data points 310 may be associated with a particular user device (e.g., user devices 110 of FIG. 1), and may be network usage data as described herein. The information (e.g., network usage data) associated with each user device may be updated, and as such, the data that data points 310 are based on may be updated. This may occur periodically, such as every 7, 14, or 30 days. In other embodiments, this may occur in real-time. When the information associated with data points 310 is updated, the first-level cluster centroids 320 and second-level cluster centroids 330 may also be updated or re-determined. The clusters 340 may also be updated or re-determined as necessary as well. These steps are illustrated by FIGS. 3D-3F.

Figure 3D:
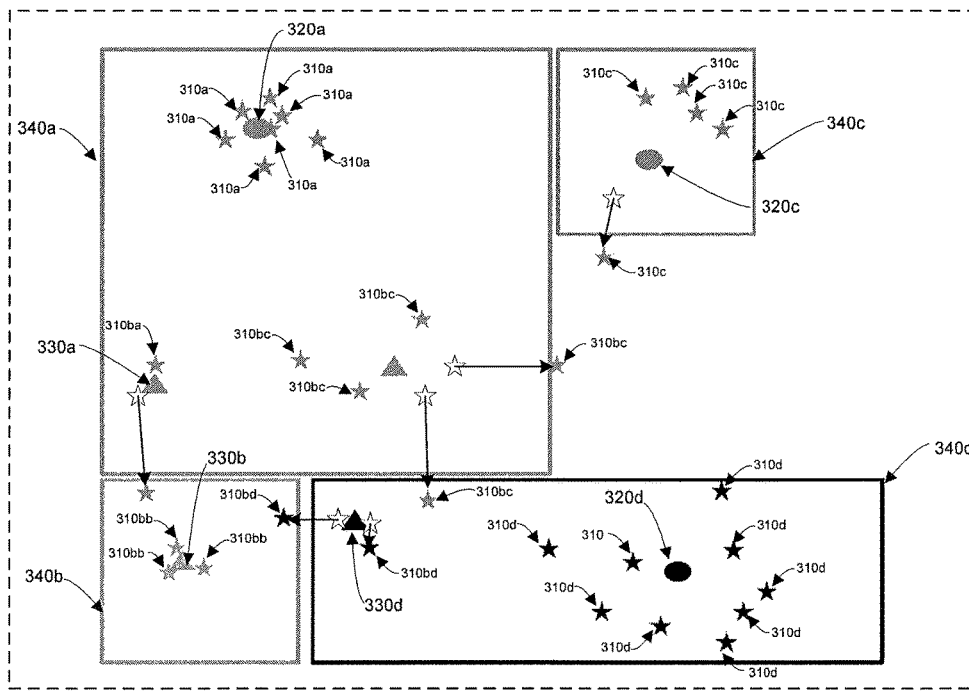
Figure 3E:
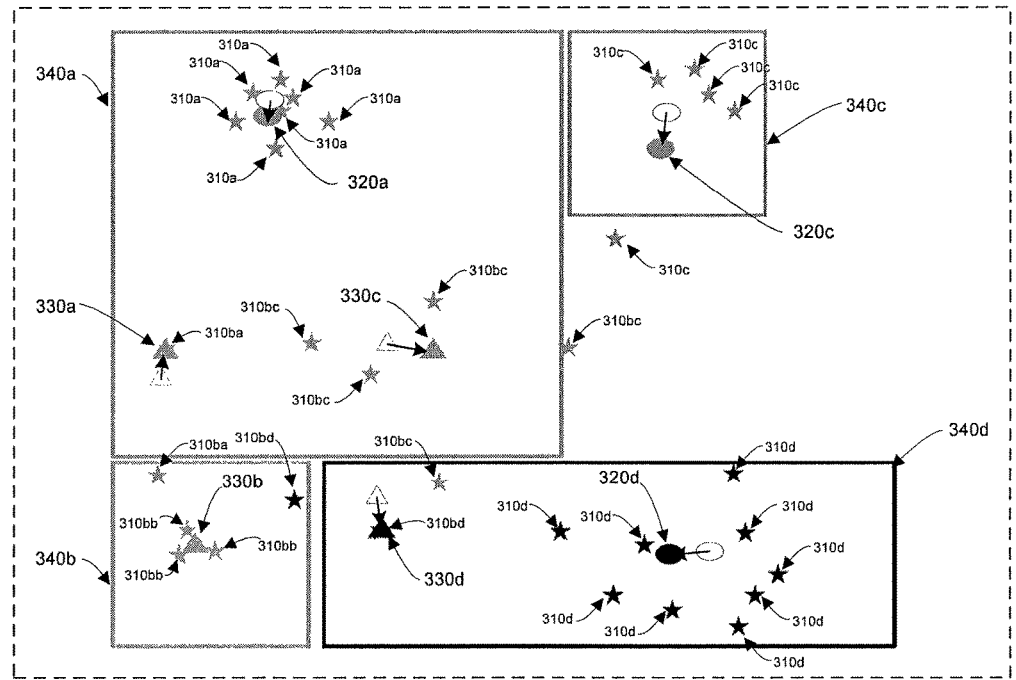
Figure 3F:
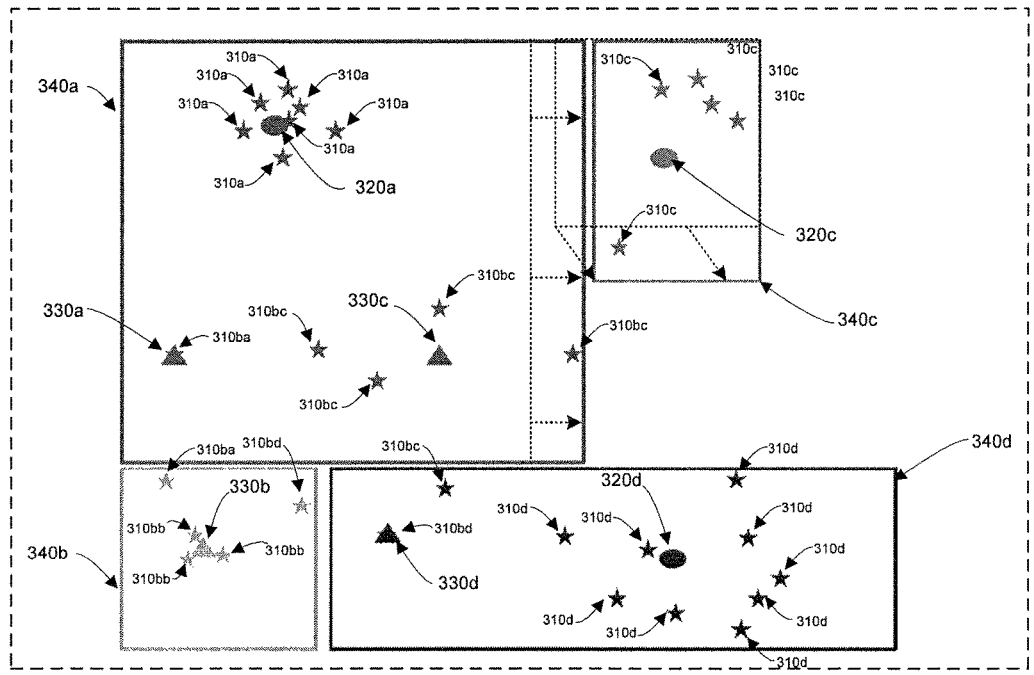

For instance, in FIG. 3D, one of data points 310ba, two of data points 310bc, two of data points 310bd, and one of data points 310c has moved based on new information associated with the respective data points being received. As a results, each of the first-level cluster centroids 320 and second-level cluster centroids 330 is updated as shown in FIG. 3E, where first-level cluster centroids 320a, 320c, and 320d, and second-level cluster centroids 330a, 330c, and 330d have all moved in response to the updated data.

Based on the new locations of first-level cluster centroids 320a, 320c, and 320d, and second-level cluster centroids 330a, 330c, and 330d, the data points 310 may be re-assigned and the clusters 340 may be re-determined and assigned. For instance, as shown in FIG. 3F, the data point 310ba that moved has been re-assigned from second-level cluster centroid 330a to second-level cluster centroid 330b. Likewise, one of the data points 310bd that moved has been re-assigned from second-level cluster centroid 330d to second-level cluster centroid 330b, and one of the two data points 310bc that moved has been re-assigned from second-level cluster centroid 330c to second-level cluster centroid 330d. However, the other data point 310bc that moved has remained assigned to second-level cluster centroid 330c as shown, just as the other data point 310bd that moved has remained assigned to second-level cluster centroid 330d, and as data point 310c that moved has remained assigned to first-level cluster centroid 320c. Furthermore, the boundaries of clusters 340a and 340c have changed in response to the updated data points and cluster centroids, as illustrated in FIG. 3F.

Modifications, additions, and omissions may be made to FIGS. 3A-3F without departing from the scope of the present disclosure. For example, a number of additional second-level cluster centroids, third-level cluster centroids, or fourth-level cluster centroids may be determined in addition to the first-level cluster centroids 320 and the second-level cluster centroids 330 shown in FIGS. 3A-3F.

FIGS. 4A-4B illustrate an example data structure 400 before and after, respectively, determining and assigning data points to second-level cluster centroids in accordance with embodiments of the present disclosure. In particular, data structure 400 represents example network usage data that indicates activity associated with user devices accessing webpages on a network (e.g., user devices 110 accessing webpages 120 using network 130 of FIG. 1). Hierarchical clustering methods of the present disclosure may be performed on one or more elements of data structure 400 to analyze the behavior of the user devices. However, it will be understood that data structure 400 may represent other types of data as necessary, and the hierarchical clustering methods of the present disclosure may be performed on any suitable format of data structure 400.

Data structure 400 comprises a number of rows 410 and columns 420, wherein each row 410 represents a unique device on a network and each column 420 of the row 410 represents a particular type of information associated with the device represented by the row 410. Example types of information represented by columns 420 include an identifier (e.g., "Device ID" in FIGS. 4A-4B), a number of days the device has been active on the network (e.g., "Days on Network" in FIGS. 4A-4B), a number of webpages visited or accessed by the device while on the network (e.g., "# Pages Visited" in FIGS. 4A-4B), a number of potentially risky webpages visited or accessed by the device while on the network (e.g., "'Yellow' Page Visits" in FIGS. 4A-4B), a number of known risky webpages visited or accessed by the device while on the network (e.g., "'Red' Page Visits" in FIGS. 4A-4B), a number of pages visited per day (e.g., "Pages/day" in FIGS. 4A-4B), a relative activity level of the device on the network (e.g., "Activity level" in FIGS. 4A-4B), a combination of potentially and known risky pages visited or accessed by the device while on the network (e.g., "'Yellow'+'Red'" in FIGS. 4A-4B), a cluster centroid assignment (e.g., "Cluster Centroid ID" in FIGS. 4A-4B), and a cluster assignment (e.g., "Cluster ID" in FIGS. 4A-4B).

Some of the types of information represented by columns 420 may be raw collected data. For example, the "Device ID" column may represent a unique hardware address of the user device and the "# Pages Visited" column may represent the raw number of webpages visited or accessed by the device while on the network. Other information represented by columns 420 may include data that is based on the raw data collected. For example, the "Pages/day" column may represent a calculation of the number of webpages visited or accessed per day the user device has been on the network. As another example, the "Activity level" column may represent a determination that is based on one or more thresholds of pages visited or accessed per day. As yet another example, the "Cluster Centroid ID" and "Cluster ID" columns may represent information that is determined using one or more of the data elements in columns 420 (e.g., the information in one or more of the "Pages/day," "Activity level," and/or "'Yellow'+'Red'" columns).

As illustrated in FIGS. 4A-4B, each device represented by a row 410 of data structure 400 may be assigned to a cluster centroid after a first pass clustering method as described above (e.g., a k-means clustering method) is performed on data points represented by elements of data structure 400. The data points may be composed of one or more of the elements or information in columns 420, in certain embodiments. Next, a second pass clustering method as described above (e.g., a k-means clustering method) may be performed on certain of the data points represented by elements of data structure 400. Then, the data points may be assigned to particular clusters.

As illustrated, after the first pass clustering method yielded two cluster centroids (Cluster Centroid IDs 1 and 2), a second pass clustering method performed on the data points associated with Device IDs 1 and 5 yielded a third and fourth cluster centroid (Cluster Centroid IDs 3 and 4) that replaced Cluster Centroid ID 2. As used herein, Cluster Centroid IDs 1 and 2 in this example may represent first-level cluster centroids, and Cluster Centroid IDs 3 and 4 in this example may represent second-level cluster centroids. The data points associated with Device IDs 1, 3, and 5 may have been chosen for further clustering analysis due to their relatively larger distances to the Cluster Centroid ID 2 when compared to the distances of the data points associated with Device IDs 2 and 4 to Cluster Centroid ID 1. After the second pass, each of the data points may be assigned to cluster identifiers.

In the example shown in FIGS. 4A-4B, the data points associated with Device IDs 1 and 5 have been clustered into the "Risky" category due to their relatively high activity levels (e.g., "Pages/day" greater than a threshold of 20) and numbers of risky and potentially risky webpages viewed or accessed (e.g., "'Yellow'+'Red'" greater than a threshold of 10). The data points associated with Device IDs 2 and 4 have been clustered into the "Safe" category due to their relatively low activity levels (e.g., "Pages/day" less than the threshold of 20) and numbers of risky and potentially risk webpages viewed or accessed (e.g., "'Yellow'+'Red'" less than the threshold of 10). The data point associated with Device ID 3 has been clustered into the "Potentially Risky" category due to its relatively low activity level (e.g., "Pages/day" less than the threshold of 20) but relatively high number of risky and potentially risk webpages viewed or accessed (e.g., "'Yellow'+'Red'" greater than the threshold of 10). As will be understood, the results of the hierarchical clustering shown in FIG. 4B results in much more accurate predictions of riskiness of the user devices than the results of the single pass clustering shown in FIG. 4A.

Modifications, additions, and omissions may be made to FIGS. 4A-4B without departing from the scope of the present disclosure. For example, data structure 400 may comprise additional or fewer rows 410 or columns 420 as necessary. In addition, other data elements may be represented by columns 420, such as a number of unique domains visited by the user device.

Figure 5:
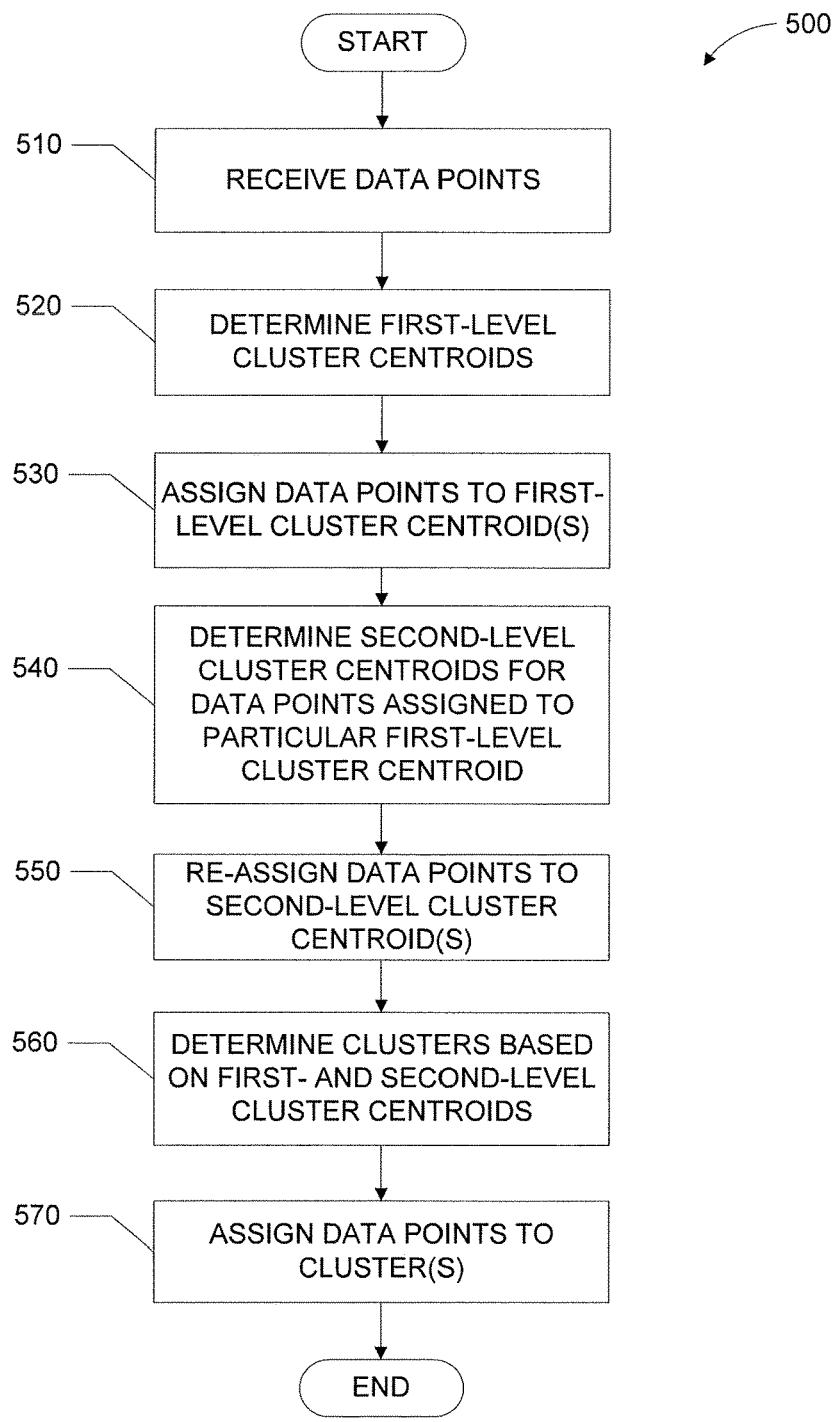
FIG. 5 illustrates an example method for clustering data points in accordance with embodiments of the present disclosure.

FIG. 5 illustrates an example method 500 for clustering data points in accordance with embodiments of the present disclosure. Method 500 may be encoded in instructions (e.g., instructions 230 of FIG. 2) that are embodied on one or more computer readable media (e.g., memory 220 or storage 240 of FIG. 2), and may be performed by one or more processors (e.g., processor 210 of FIG. 2) executing those instructions. For clarity, method 500 is described below with reference to items described above with respect to FIG. 1.

The method may begin at step 510, where server 140 receives a plurality of data points. The data points may be received or accessed from memory or storage that is local to server 140, or may be received or accessed from database 145 coupled thereto. The data points may be based on elements of a data structure (e.g., data structure 400 of FIGS. 4A-4B) that includes network usage data indicating activity on network 130 by the user devices 110 on a plurality of webpages 120. For example, the data points may include one or more elements of the data in the data structure (e.g., one or more columns of data structure 400). In certain embodiments, each data point comprises information associated with a unique identifier.

At step 520, server 140 determines a plurality of first-level cluster centroids using the plurality of data points received at step 510. The first-level cluster centroids may be determined using any suitable cluster methodology, and may be determined using k-means clustering methods in certain embodiments. At step 530, each data point is assigned to at least one of the first-level cluster centroids. This may be done based on a distance from the data point to the first-level centroid. For example, the data point may be assigned to the first-level centroid that is at the smallest distance away.

At step 540, server 140 determines a plurality of second-level cluster centroids using data points assigned to a particular first-level cluster centroid. The second-level cluster centroids may be determined using any suitable cluster methodology, and may be determined using k-means clustering methods in certain embodiments. At step 550, each of the data points previously assigned to the particular first-level cluster centroid is assigned to at least one of the second-level cluster centroids. It will be understood that steps 540 and 550 may be repeated in certain embodiments as necessary for additional first-level cluster centroids.

In addition, it will be understood that the same hierarchical process may be continued in additional level, with third-level cluster centroids being determined for a particular second-level cluster centroid, fourth-level cluster centroids being determined for a particular third-level cluster centroid, and so on. For example, a plurality of third-level cluster centroids may be determined using data points assigned to a first second-level cluster centroid, and each data point previously assigned to the first second-level cluster centroid may be assigned to at least one of the third-level cluster centroids.

At step 560, server 140 determines a plurality of clusters based on the first-level cluster centroids and the second-level cluster centroids determined at steps 520 and 540, respectively. The clusters may be determined using any suitable methodology, and may be based on relative distances between the different cluster centroids. For instance, in certain embodiments, each cluster of the plurality of clusters may be determined based on relative locations and/or distances of the first-level cluster centroids and the second-level cluster centroids. Finally, at step 570, each data point is assigned to at least one cluster of the plurality of clusters. In embodiments with third-level cluster centroids or other additional cluster centroids, the plurality of clusters may be further based on the third-level cluster centroids and other additional cluster centroids.

In certain embodiments, updated information may be received for certain unique identifiers. This may occur in real-time or periodically. In response to receiving the updated information, server 140 may determine updated first-level cluster centroids and updated second-level cluster centroids using the updated information. Server 140 may then determine a plurality of updated clusters based on the updated first-level cluster centroids and updated second-level cluster centroids using the updated information, and may assign each data point to at least one updated cluster of the plurality of updated clusters.

In certain embodiments, server 140 may iteratively determine a plurality of subsequent cluster centroids (e.g., third-level cluster centroids, fourth-level cluster centroids, and so on) using data points assigned to the first-level cluster centroids or the second-level cluster centroids, and assign each of the data points to at least one of the subsequent cluster centroid until an average distance of the data points to their respective assigned subsequent cluster centroids is below a threshold.

In certain embodiments, data points may be assigned to multiple cluster centroids. For instance, server 140 may assign a particular data point to two or more centroids that include: two or more first-level cluster centroids, two or more second-level cluster centroids, or a first-level cluster centroid and a second-level cluster centroid. This may be done based on distances from the particular data point to the two or more centroids. For example, a data point may be assigned to two or more cluster centroids where the distance between the data point and the two or more cluster centroids is within a certain threshold.

Modifications, additions, or omissions may be made to method 500 without departing from the scope of the present disclosure, and method 500 may include more, fewer, or other steps. For example, steps may be performed in parallel or in any suitable order. While discussed as server 140 performing the steps, any suitable component of system 100, such as user devices 110 or other servers for example, may perform one or more steps of the method.

Figure 6:
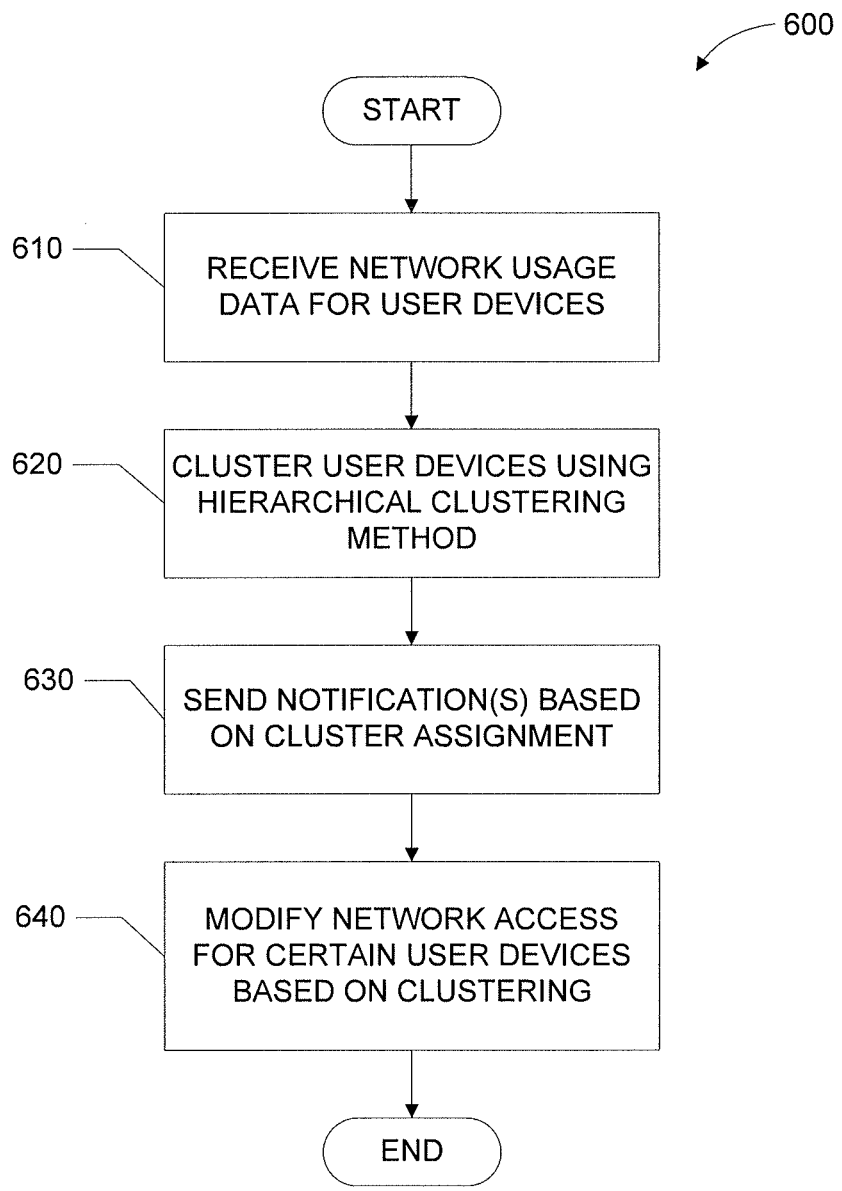
FIG. 6 illustrates an example method for clustering user devices based on network usage data in accordance with embodiments of the present disclosure.

FIG. 6 illustrates an example method 600 for clustering user devices based on network usage data in accordance with embodiments of the present disclosure. Method 600 may be encoded in instructions (e.g., instructions 230 of FIG. 2) that are embodied on one or more computer readable media (e.g., memory 220 or storage 240 of FIG. 2), and may be performed by one or more processors (e.g., processor 210 of FIG. 2) executing those instructions. For clarity, method 500 is described below with reference to items described above with respect to FIG. 1.

The method may begin at step 610, where server 140 receives network usage data for the user devices 110 on the network 130. The first network usage data may indicate activity by the user devices 110 on a plurality of webpages 120, in particular embodiments. For example, the network usage data may include one or more elements of data in a data structure similar to data structure 400 of FIGS. 4A-4B.

At step 620, server 140 clusters the user devices 110 using a hierarchical method according to the present disclosure. In particular embodiments, this may include determining a plurality of first-level cluster centroids based on the first network usage data; assigning each user device 110 to at least one of the first-level cluster centroids; determining a plurality of second-level cluster centroids based on the first network usage data for user devices 110 assigned to a first first-level cluster centroid; assigning each user device 110 previously assigned to the first first-level cluster centroid to at least one of the second-level cluster centroids; determining a plurality of clusters based on the first-level cluster centroids and the second-level cluster centroids; and assigning each user device 110 to at least one cluster of the plurality of clusters.

In some embodiments, determining the first-level cluster centroids includes combining data elements of the network usage data received at step 610. In such embodiments, the first-level cluster centroids are based on the combined data elements of the network usage data.

In some embodiments, determining the plurality of first-level cluster centroids includes determining a level of activity for each of the user devices 110. The level may be chosen from a plurality of pre-determined levels of activity, which may include at least a high-activity level and a low-activity level. In such embodiments, server 140 may determine the first-level cluster centroids separately for users having high and low activity levels. For example, a first set of first-level cluster centroids may be determined based on the network usage data for user devices 110 having a low-activity level, and a second set of first-level cluster centroids may be determined based on the network usage data for user devices 110 having a high-activity level.

In some embodiments, determining the plurality of first-level cluster centroids includes determining, for each of the user devices 110, a number of days of activity on the network. In such embodiments, server 140 may determine the first-level cluster centroids separately for "newer" user devices 110 and "older" user devices 110. For example, a first set of first-level cluster centroids may be determined based on the network usage data for user devices 110 having a number of days of activity below a threshold, and a second set of first-level cluster centroids may be determined based on the network usage data for user devices 110 having a number of days of activity above a threshold.

At step 630, server 140 sends one or more notifications based on the clustering performed at step 620. This may include sending one or more notifications to user devices 110 associated with a first cluster of the plurality of clusters. Finally, at step 640, server 140 modifies network access for certain user devices 110 based on the clustering performed at step 620. This may include blocking or otherwise limiting network or webpage access for the certain user devices 110.

In certain embodiments, server 140 may receive updated network usage data for particular user devices 110. In response to receiving the updated network usage data, server 140 may determine updated first-level cluster centroids and updated second-level cluster centroids using the updated network usage data. Server 140 may then assign at least one user device 110 to a different cluster based on the updated first-level cluster centroids and updated second-level cluster centroids. Further, in response to assigning the at least one user device 110 to the different cluster, server 140 may send one or more additional notifications to the at least one user device 110.

Modifications, additions, or omissions may be made to method 600 without departing from the scope of the present disclosure, and method 600 may include more, fewer, or other steps. For example, steps may be performed in parallel or in any suitable order. While discussed as server 140 performing the steps, any suitable component of system 100, such as user devices 110 or other servers for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A method comprising:
   receiving first network usage data for a plurality of user devices, the first network usage data indicating activity by the user devices on a plurality of webpages;
   determining a plurality of first-level cluster centroids based on the first network usage data;
   assigning each user device to at least one of the first-level cluster centroids;

selecting a first-level cluster centroid from the at least one of the first-level cluster centroids, the user devices assigned to the selected first-level cluster centroid having an average distance to the selected first-level cluster centroid that is greater than a threshold;

determining a plurality of second-level cluster centroids based on the first network usage data for user devices assigned to the selected first first-level cluster centroid;

assigning each user device previously assigned to the selected first first-level cluster centroid to at least one of the second-level cluster centroids;

determining a plurality of clusters based on the first-level cluster centroids and the second-level cluster centroids;

assigning each user device to at least one cluster of the plurality of clusters; and sending one or more first notifications to user devices associated with a first cluster of the plurality of clusters.

2. The method of claim 1, further comprising:

receiving second network usage data for one or more first user devices; and in response to receiving the second network usage data, determining updated first-level cluster centroids and updated second-level cluster centroids using the first network usage data and the second network usage data.

3. The method of claim 2, further comprising:

assigning at least one first user device to a different cluster based on the updated first-level cluster centroids and updated second-level cluster centroids; and in response to assigning the at least one first user device to the different cluster, sending one or more second notifications to the at least one first user device.

4. The method of claim 1, wherein determining the plurality of first-level cluster centroids based on the first network usage data comprises combining data elements of the first network usage data, and the first-level cluster centroids are based on the combined data elements of the first network usage data.

5. The method of claim 1, wherein determining the plurality of first-level cluster centroids based on the first network usage data comprises:

determining, for each of the user devices, a level of a plurality of levels of activity, the levels of activity including at least a high-activity level and a low-activity level; and determining a first set of first-level cluster centroids based on the first network usage data for user devices having a low-activity level; and determining a second set of first-level cluster centroids based on the first network usage data for user devices having a high-activity level.

6. The method of claim 1, wherein determining the plurality of first-level cluster centroids based on the first network usage data comprises:

determining, for each of the user devices, a number of days of activity on the network; and determining a first set of first-level cluster centroids based on the first network usage data for user devices having a number of days of activity below a threshold; and determining a second set of first-level cluster centroids based on the first network usage data for user devices having a number of days of activity above a threshold.

7. The method of claim 1, further comprising modifying webpage access for user devices associated with the first cluster of the plurality of clusters.

8. A system, comprising:

one or more memory comprising instructions;

one or more interfaces configured to receive first network usage data for a plurality of user devices, the first network usage data indicating activity by the user devices on a plurality of webpages; and one or more processors communicably coupled to the memory and the interfaces and configured, when executing the instructions, to:

determine a plurality of first-level cluster centroids based on the first network usage data;

assign each user device to at least one of the first-level cluster centroids;

select a first-level cluster centroid from the at least one of the first-level cluster centroids, the user devices assigned to the selected first-level cluster centroid having an average distance to the selected first-level cluster centroid that is greater than a threshold;

determine a plurality of second-level cluster centroids based on the first network usage data for user devices assigned to the selected first first-level cluster centroid;

assign each user device previously assigned to the selected first first-level cluster centroid to at least one of the second-level cluster centroids;

determine a plurality of clusters based on the first-level cluster centroids and the second-level cluster centroids; and assign each user device to at least one cluster of the plurality of clusters;

wherein the one or more interfaces are further configured to send one or more first notifications to user devices associated with a first cluster of the plurality of clusters.

9. The system of claim 8, wherein the one or more processors are further configured, when executing the instructions, to:

receive second network usage data for one or more first user devices; and in response to receiving the second network usage data, determine updated first-level cluster centroids and updated second-level cluster centroids using the first network usage data and the second network usage data.

10. The system of claim 9, wherein the one or more processors are further configured, when executing the instructions, to:

assign at least one first user device to a different cluster based on the updated first-level cluster centroids and updated second-level cluster centroids; and in response to assigning the at least one first user device to the different cluster, send one or more second notifications to the at least one first user device.

11. The system of claim 8, wherein determining the plurality of first-level cluster centroids based on the first network usage data comprises combining data elements of the first network usage data, and the first-level cluster centroids are based on the combined data elements of the first network usage data.

12. The system of claim 8, wherein determining the plurality of first-level cluster centroids based on the first network usage data comprises:

determining, for each of the user devices, a level of a plurality of levels of activity, the levels of activity including at least a high-activity level and a low-activity level; and determining a first set of first-level cluster centroids based on the first network usage data for user devices having a low-activity level; and determining a second set of first-level cluster centroids based on the first network usage data for user devices having a high-activity level.

13. The system of claim 8, determining the plurality of first-level cluster centroids based on the first network usage data comprises:
   determining, for each of the user devices, a number of days of activity on the network; and
   determining a first set of first-level cluster centroids based on the first network usage data for user devices having a number of days of activity below a threshold; and
   determining a second set of first-level cluster centroids based on the first network usage data for user devices having a number of days of activity above a threshold.

14. The system of claim 8, further comprising modifying webpage access for user devices associated with the first cluster of the plurality of clusters.

15. One or more computer readable media comprising instructions that are configured, when executed by a processor, to:
   receive first network usage data for a plurality of user devices, the first network usage data indicating activity by the user devices on a plurality of webpages;
   determine a plurality of first-level cluster centroids based on the first network usage data;
   assign each user device to at least one of the first-level cluster centroids;
   select a first-level cluster centroid from the at least one of the first-level cluster centroids, the user devices assigned to the selected first-level cluster centroid having an average distance to the selected first-level cluster centroid that is greater than a threshold;
   determine a plurality of second-level cluster centroids based on the first network usage data for user devices assigned to the selected first first-level cluster centroid;
   assign each user device previously assigned to the selected first first-level cluster centroid to at least one of the second-level cluster centroids;
   determine a plurality of clusters based on the first-level cluster centroids and the second-level cluster centroids;
   assign each user device to at least one cluster of the plurality of clusters; and
   send one or more first notifications to user devices associated with a first cluster of the plurality of clusters.

16. The more computer readable media of claim 15, further comprising:
   receiving second network usage data for one or more first user devices; and
   in response to receiving the second network usage data, determining updated first-level cluster centroids and updated second-level cluster centroids using the first network usage data and the second network usage data.

17. The more computer readable media of claim 16, further comprising:
   assigning at least one first user device to a different cluster based on the updated first-level cluster centroids and updated second-level cluster centroids; and
   in response to assigning the at least one first user device to the different cluster, sending one or more second notifications to the at least one first user device.

18. The more computer readable media of claim 15, wherein determining the plurality of first-level cluster centroids based on the first network usage data comprises combining data elements of the first network usage data, and the first-level cluster centroids are based on the combined data elements of the first network usage data.

19. The more computer readable media of claim 15, wherein determining the plurality of first-level cluster centroids based on the first network usage data comprises:
   determining, for each of the user devices, a level of a plurality of levels of activity, the levels of activity including at least a high-activity level and a low-activity level; and
   determining a first set of first-level cluster centroids based on the first network usage data for user devices having a low-activity level; and
   determining a second set of first-level cluster centroids based on the first network usage data for user devices having a high-activity level.

20. The more computer readable media of claim 15, wherein determining the plurality of first-level cluster centroids based on the first network usage data comprises:
   determining, for each of the user devices, a number of days of activity on the network; and
   determining a first set of first-level cluster centroids based on the first network usage data for user devices having a number of days of activity below a threshold; and
   determining a second set of first-level cluster centroids based on the first network usage data for user devices having a number of days of activity above a threshold.

\* \* \* \* \*